(No Model.)

C. L. FERRIOTT.
COTTON CHOPPER AND CULTIVATOR.

No. 453,554. Patented June 2, 1891.

WITNESSES:

INVENTOR
C. L. Ferriott
BY O. E. Duff
ATTORNEY.

UNITED STATES PATENT OFFICE.

CHARLES L. FERRIOTT, OF ARMOUR, TEXAS.

COTTON CHOPPER AND CULTIVATOR.

SPECIFICATION forming part of Letters Patent No. 453,554, dated June 2, 1891.

Application filed December 2, 1890. Serial No. 373,316. (No model.)

*To all whom it may concern:*

Be it known that I, CHARLES L. FERRIOTT, of Armour, in the county of Limestone and State of Texas, have invented certain new and useful Improvements in Cotton Choppers and Cultivators; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in cotton choppers and cultivators.

The object of the invention is to provide an improved cotton chopper and cultivator exceedingly cheap and durable in construction and sure and effective in operation, and wherein the cotton is cut off by the shearing action between a rotary hoe and a cutter-bar traveling along beside the row.

These objects are accomplished by and this invention consists in certain novel features of construction and in combinations of parts more fully described hereinafter, and particularly pointed out in the claims.

Figure 1:
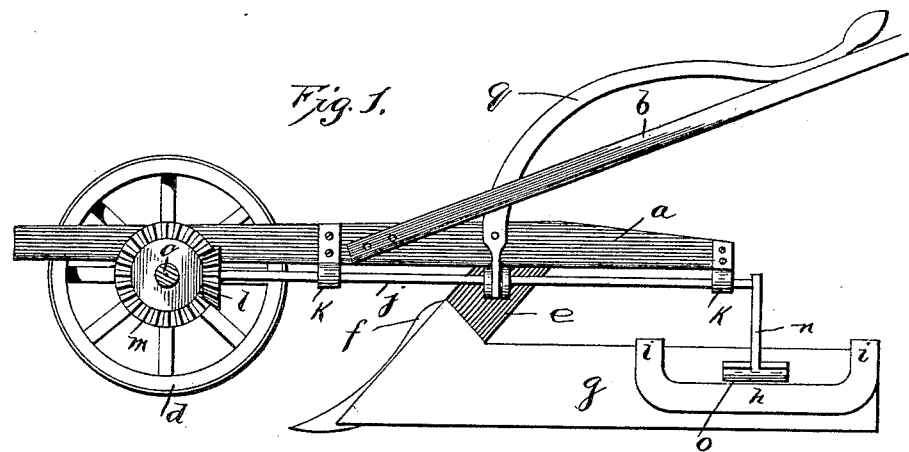
Figure 2:
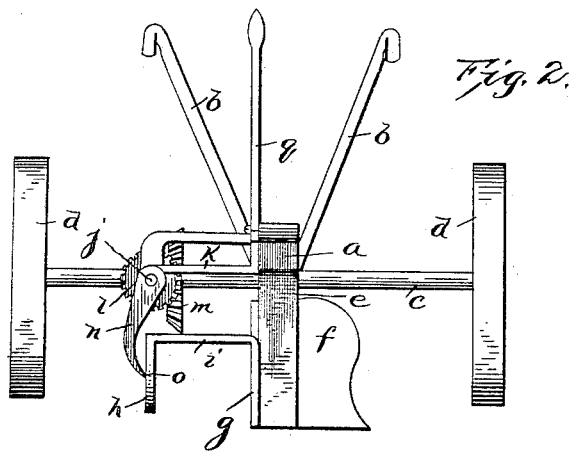

Referring to the accompanying drawings, Figure 1 is a side elevation of the machine. Fig. 2 is a rear elevation of the same.

In the drawings, the reference-letter $a$ indicates the plow-beam of the machine, having the handles $b$ at the rear thereof and the rotating axle $c$ mounted in and supporting the front end thereof and carried by wheels $d\ d$, the front end of the beam being preferably located nearer one wheel than the other. The plow-standard $e$ extends down from the rear portion of the beam and carries the side-turning plow-blade $f$, arranged to turn the earth in the direction of the wheel $d$ nearest the beam. The landside $g$ is secured to the other side of the standard and is extended rearwardly a suitable distance for the purpose hereinafter mentioned. This rearward extension of the landside carries the cutter-bar $h$, arranged parallel with said extension and at a distance from the outside face of the same, so as to travel close beside the cotton-plants while the plow is working the ground between the rows and with its top edge on a level with or slightly above the surface of the ground. The top edge of this metal bar $h$ is preferably cut off square and straight, and the bar has arms $i\ i$, extending up from its ends and laterally to the top of the landside extension, to which they are rigidly and strongly secured. The arms $i$ are preferably integral with the cutter-bar. A horizontal rotary shaft $j$ is longitudinally located beside and parallel with the beam on the same side as the bars $h$, over which its rear end projects. This shaft is carried by the beam by means of brackets $k$. The front end of the shaft has a bevel-pinion $l$, adapted to mesh with bevel-gear $m$, rigid on axle $c$. A chopping-hoe $n$ is rigid on and extends radially from the rear end of said rotary shaft, and the shank of said hoe is so turned that the blade $o$ will engage or slide across the top edge of said bar $h$ flatly, and so that the front cutting-edge of the hoe will coact with the top edge of the bar to cut with a shearing action, the shaft being rotated from the axle by the gearing, so that the hoe moves toward the outer side of the bar. The shaft is mounted in said brackets to have sufficient longitudinal movement to throw the bevel-gearing in and out of gear, and this movement is regulated by lever $q$, fulcrumed on the plow-beam with its lower end forked and loosely fitting between two rigid collars on the shaft, while its handle end extends up between handles $b$ and normally rests on a cross-bar connecting said handles, in which position it holds the shaft in gear. The draft is suitably attached to the front end of the beam.

In operation the machine is drawn along between the rows of cotton-plants and the plow turns or scrapes the earth from one side of the row, the shaft being out of gear. The machine then is drawn back on the other side of the row, the cutter-bar moving close beside the plants, and the shaft is thrown into gear, whereby the hoe is rotated and at regular intervals moves around and catches the plants between its cutting-edge and the bar $h$, and shears them off close to the ground.

The many advantages and great utility of this machine will be obvious to those having practical experience with cotton culture and machines therefor.

It is evident that various changes might be made in the form and arrangement of the parts described without departing from the spirit and scope of my invention. Hence I do not wish to limit myself to the precise construction herein set forth.

What I claim is—

1. The combination of the turning-plow having its landside extended rearwardly, the bar parallel and rigid with said landside arranged to run close beside the plants, with the rotary hoe to coact with said bar to shear off the plants.

2. In combination, the side-turning plow rigid with the plow-beam, the supporting-wheels, the cutter-bar moving parallel with the plow, and the shaft driven by said wheels and having a hoe to coact with said bar to shear off the plants.

3. In combination, the plow-beam, plow carried thereby, the cutter-bar a distance from and rigid with a part of the machine by means of arms extending from the end of the bar, said bar being arranged to move parallel with the rows, the rotary hoe coacting with said bar to shear off the plants and actuating means for the hoe.

In testimony that I claim the foregoing as my own I affix my signature in presence of two witnesses.

CHARLES L. FERRIOTT.

Witnesses:
S. C. McELROY,
J. N. WOOD.